(12) United States Patent
Kadouchi et al.

(10) Patent No.: US 7,489,231 B2
(45) Date of Patent: Feb. 10, 2009

(54) ELECTROMAGNETIC WAVE RECEPTION DEVICE, ELECTROMAGNETIC WAVE TRANSMISSION DEVICE, AND VEHICLE

(75) Inventors: Eiji Kadouchi, Toyohashi (JP); Ichiro Maki, Yokohama (JP)

(73) Assignee: Panasonic Corporation, Osaka (JP)

( * ) Notice: Subject to any disclaimer, the term of this patent is extended or adjusted under 35 U.S.C. 154(b) by 486 days.

(21) Appl. No.: 10/528,726

(22) PCT Filed: May 7, 2004

(86) PCT No.: PCT/JP2004/006482

§ 371 (c)(1),
(2), (4) Date: Mar. 22, 2005

(87) PCT Pub. No.: WO2004/104335

PCT Pub. Date: Dec. 2, 2004

(65) Prior Publication Data

US 2005/0247088 A1 Nov. 10, 2005

(30) Foreign Application Priority Data

May 20, 2003 (JP) .............................. 2003-141737

(51) Int. Cl.
E05B 43/00 (2006.01)

(52) U.S. Cl. .................. 340/5.72; 340/5.7; 340/825.69; 70/271; 70/263; 307/10.5

(58) Field of Classification Search .......... 70/271, 70/263; 340/5.7, 825.69, 5.72, 5.64, 539.3; 341/176; 455/458, 574
See application file for complete search history.

(56) References Cited

U.S. PATENT DOCUMENTS 5,799,256 A * 8/1998 Pombo et al. ............... 455/574

6,700,493 B1 * 3/2004 Robinson ................. 340/573.1
7,005,960 B2 * 2/2006 Flick ......................... 340/5.72
2002/0093481 A1 * 7/2002 Kehlstadt .................... 345/156
2002/0180588 A1 * 12/2002 Erickson et al. ............. 340/10.2

FOREIGN PATENT DOCUMENTS

| JP | 10-231651 | 9/1998 |
|---|---|---|
| JP | 10-336760 | 12/1998 |
| JP | 2003-70083 | 3/2003 |
| JP | 2003-102068 | 4/2003 |
| JP | 2003-102068 A | 4/2003 |
| JP | 2003/102068 A * | 4/2003 |

OTHER PUBLICATIONS

International Search Report corresponding to application No. PCT/JP2004/006482 dated Sep. 7, 2004.

* cited by examiner

Primary Examiner—Brian A Zimmerman
Assistant Examiner—Yong Hang Jiang
(74) Attorney, Agent, or Firm—RatnerPrestia

(57) ABSTRACT

An electromagnetic wave reception device includes: a input reception portion for detecting an input electromagnetic wave transmitted from a transmission terminal at a predetermined timing and receiving the input electromagnetic wave; a lock control portion for unlocking or locking a locking mechanism, according to the input electromagnetic wave received by the input reception portion; and a timing change portion for changing the timing at which the input reception section detects the input electromagnetic wave, according to time zones. This structure provides an electromagnetic wave reception device capable of not affecting the convenience of the user while reducing the power consumption in receiving the input electromagnetic wave transmitted from the transmission terminal (e.g. a remote controller).

26 Claims, 10 Drawing Sheets

H: Three times a second
M: Once a second
L: Once every two seconds

|   | A | B | C | D | E | ... |
|---|---|---|---|---|---|-----|
| 1 | M | L | H | L | L | ... |
| 2 | L | L | M | L | M | ... |
| 3 | L | L | L | L | L | ... |
| 4 | M | H | M | L | M | ... |
| : | : | : | : | : | : | ... |

H: Three times a second
M: Once a second
L: Once every two seconds

FIG. 10A

| | 0 o'clock | 2 o'clock | 4 o'clock | 6 o'clock | 8 o'clock | 10 o'clock | 12 o'clock | 14 o'clock | 16 o'clock | 18 o'clock | 20 o'clock | 22 o'clock | 24 o'clock |
|---|---|---|---|---|---|---|---|---|---|---|---|---|---|
| 1st to 10th | 0 | 0 | 0 | 16 | 4 | 4 | 2 | 5 | 9 | 8 | 5 | 1 | |
| 11st to 20th | 0 | 0 | 1 | 18 | 3 | 3 | 0 | 2 | 12 | 7 | 6 | 2 | |
| 21st to 31th | 0 | 0 | 0 | 5 | 2 | 0 | 0 | 2 | 3 | 6 | 2 | 0 | |

FIG. 10B

| | 0 o'clock | 2 o'clock | 4 o'clock | 6 o'clock | 8 o'clock | 10 o'clock | 12 o'clock | 14 o'clock | 16 o'clock | 18 o'clock | 20 o'clock | 22 o'clock | 24 o'clock |
|---|---|---|---|---|---|---|---|---|---|---|---|---|---|
| 1st to 10th | 0 | 0 | 0 | 16 | 4 | 4 | 2 | 5 | 9 | 8 | 5 | 1 | |
| 11st to 20th | 0 | 0 | 1 | 18 | 3 | 3 | 0 | 2 | 12 | 7 | 6 | 2 | |
| 21st to 31th | 1 | 0 | 0 | 15 | 6 | 4 | 2 | 3 | 10 | 12 | 3 | 0 | |
| Total | 1 | 0 | 1 | 49 | 13 | 11 | 4 | 10 | 31 | 27 | 14 | 3 | |

History information (time)

| 0 o'clock – 6 o'clock | 6–8 o'clock | 8–16 o'clock | 16–20 o'clock | 20–22 o'clock | 22–24 o'clock |
|---|---|---|---|---|---|
| L | H | M | H | M | L |

FIG. 11A

|   | A | B | C  | D | E | ... |
|---|---|---|----|---|---|-----|
| 1 | 2 | 0 | 61 | 0 | 0 | ... |
| 2 | 0 | 0 | 2  | 0 | 2 | ... |
| 3 | 0 | 0 | 0  | 0 | 0 | ... |
| 4 | 2 | 8 | 2  | 0 | 4 | ... |
| : | : | : | :  | : | : | ... |

FIG. 11B

|   | A | B  | C  | D | E  | ... |
|---|---|----|----|---|----|-----|
| 1 | 4 | 0  | 80 | 0 | 0  | ... |
| 2 | 0 | 0  | 2  | 0 | 4  | ... |
| 3 | 0 | 0  | 0  | 0 | 0  | ... |
| 4 | 4 | 14 | 2  | 0 | 10 | ... |
| : | : | :  | :  | : | :  | ... |

History information (time)

FIG. 11D

|   | A | B | C | D | E | ... |
|---|---|---|---|---|---|-----|
| 1 | M | L | H | L | L | ... |
| 2 | L | L | M | L | M | ... |
| 3 | L | L | L | L | L | ... |
| 4 | M | H | M | L | M | ... |
| : | : | : | : | : | : | ... |

| History information (time) | History information (position) | Timing frequency |
|---|---|---|
| H | H | H |
| H | M | H |
| H | L | L |
| M | H | H |
| M | M | M |
| M | L | L |
| L | H | L |
| L | M | L |
| L | L | L |

…

ELECTROMAGNETIC WAVE RECEPTION DEVICE, ELECTROMAGNETIC WAVE TRANSMISSION DEVICE, AND VEHICLE

This application is a U.S. National Phase Application of PCT International Application PCT/JP2004/006482.

TECNICAL FIELD

The present invention relates to an electromagnetic wave reception device and the like for receiving input electromagnetic waves transmitted from a transmission terminal.

BACKGROUND ART

A keyless entry system capable of locking and unlocking an automobile without insertion of the key into the keyhole is put to practical use. Japanese Patent Unexamined Publication No. H10-231651 discloses an energy-saving example of a keyless entry system having an answer-back function in which a portable device (so-called a remote controller) can confirm if the automobile has been locked or not.

It is desirable to reduce power consumption in receiving electromagnetic waves, also on the side of a lock mechanism (a device incorporated in an automobile, for example) of a keyless entry system. Especially, a keyless entry system in an automobile and the like is powered by a battery in many cases. Also from the viewpoint of efficiently utilizing the limited power source, reduction in power consumption is required. Japanese Patent Unexamined Publication No. 10-231651 discloses a method of turning off the system unless it is necessary, to reduce power consumption. However, if reception of electromagnetic waves is stopped on the side of the lock mechanism, users cannot lock or unlock the mechanism although they want to. This poses a problem of affecting convenience of the users.

DISCLOSURE OF THE INVENTION

An electromagnetic wave reception device of the present invention includes: an input reception portion for detecting an input electromagnetic wave transmitted from a transmission terminal at predetermined timing and receiving the electromagnetic wave; a lock control portion for unlocking or locking a lock mechanism, according to the input electromagnetic wave received by the input reception portion; and a timing change portion for changing the timing at which the input reception portion detects the input electromagnetic wave. The electromagnetic wave reception device structured as above can reduce power consumption by decreasing the frequency of the timing of detecting the input electromagnetic wave. Even when the frequency of the timing is decreased, reception of the input electromagnetic wave is not stopped. For this reason, users can unlock and lock the lock mechanism. Thus, the inconvenience of the users can be avoided.

A vehicle of the present invention is a vehicle including the electromagnetic wave reception device.

An electromagnetic wave transmitter of the present invention includes: a switch; a transmission portion for transmitting an electromagnetic wave for a predetermined transmission period when the switch is turned on; and a transmission control portion for controlling so that the transmission portion transmits a second electromagnetic wave for a longer period than a first electromagnetic wave when the switch is turned on twice or more. The electromagnetic wave transmission device of the present invention structured as above transmits an electromagnetic wave for a longer period of time at the second time or after even when the transmission of the first electromagnetic wave could not achieve the objective. For this reason, the objective can more surely be achieved.

A keyless entry system of the present invention includes the electromagnetic wave reception device and the electromagnetic wave transmission device.

BRIEF DESCRIPTION OF THE DRAWINGS

FIGS. 10A to 10D are charts for explaining generation of time history information in accordance with the third exemplary embodiment.

FIGS. 11A to 11D are charts for explaining generation of position history information in accordance with the third exemplary embodiment.

DETAILED DESCRIPTION OF PREFERRED EMBODIMENTS

First Exemplary Embodiment

A description is provided of an electromagnetic wave reception device in accordance with an exemplary embodiment of the present invention with reference to the accompanying drawings.

Figure 1:
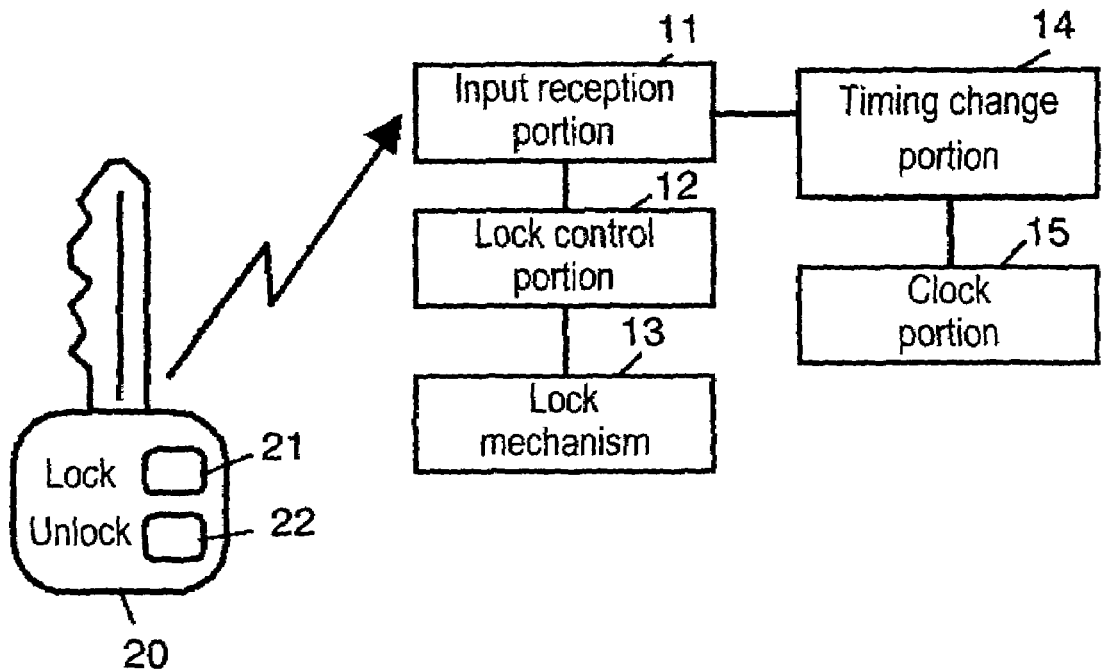
FIG. 1 is a block diagram showing a structure of an electromagnetic wave reception device in accordance with a first exemplary embodiment of the present invention.

FIG. 1 is a block diagram showing the structure of an electromagnetic wave reception device of the first exemplary embodiment. The electromagnetic wave reception device of the first exemplary embodiment includes input reception portion 11, lock control portion 12, lock mechanism 13, timing change portion 14, and clock portion 15.

Input reception portion 11 detects an input electromagnetic wave transmitted from transmission terminal 20 at a predetermined timing and receives the electromagnetic wave. Now, detecting an input electromagnetic wave means determining a fact that there has been an input electromagnetic wave. Receiving the input electromagnetic wave means receiving a signal included in the input electromagnetic wave. Specifically, it means processing, such as decoding a lock control signal for lock control on a carrier wave in the input electromagnetic wave.

Lock control portion 12 unlocks or locks lock mechanism 13, according to the input electromagnetic wave received by input reception portion 11. Lock mechanism 13 is a mechanism that unlocks or locks doors and the like, according to the control of lock control portion 12. Timing change portion 14 changes the timing at which input reception portion 11 detects the input electromagnetic wave by time zone, according to the time indicated by clock portion 15.

Next, the operation of the electromagnetic wave reception device of this embodiment is described.

Figure 2:
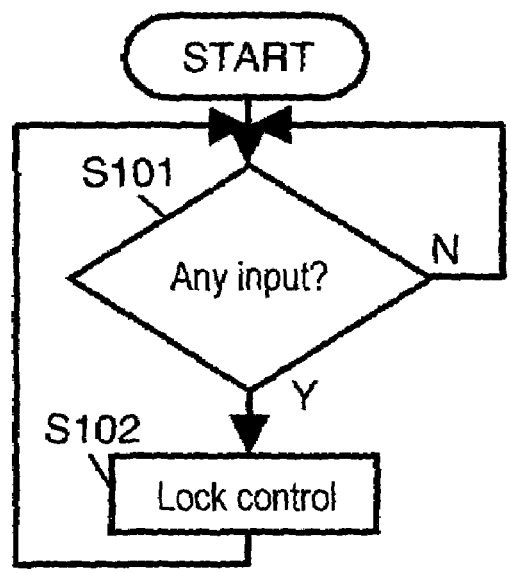
FIG. 2 is a flowchart showing an operation of the electromagnetic wave reception device in accordance with the first exemplary embodiment.

First, a description is provided of the operation of receiving an input electromagnetic wave from transmission terminal 20 and controlling the lock mechanism according to the input electromagnetic wave, with reference to the flowchart of FIG. 2.

In step S101 of FIG. 2, input reception portion 11 determines if there has been an input electromagnetic wave from transmission terminal 20. When there has been an input electromagnetic wave, it is decoded into a lock control signal for lock control. The lock control signal is passed to lock control portion 12, and the procedure goes to step S102. When the input electromagnetic wave includes an identification (ID) signal peculiar to lock control portion 12 other than the lock control signal, the ID signal is decoded and passed to lock control portion 12. On the other hand, when there has been no input, the process of step 101 is repeated until there is an input.

When receiving the lock control signal from input reception portion 11 in step S102, lock control portion 12 controls lock mechanism 13 according to the lock control signal. For example, for a lock control signal for instructing unlocking, lock control portion 12 controls lock mechanism 13 to unlock. When also receiving an ID signal from input reception portion 11, lock control portion 12 determines if the ID signal has a predetermined relation (e.g. conformity) with the ID peculiar to lock control portion 12. Then, when they have the predetermined relation, lock control portion 12 controls the lock mechanism according to the lock control signal. When they have no predetermined relation, lock control portion 12 does not control the lock mechanism.

Figure 3A:
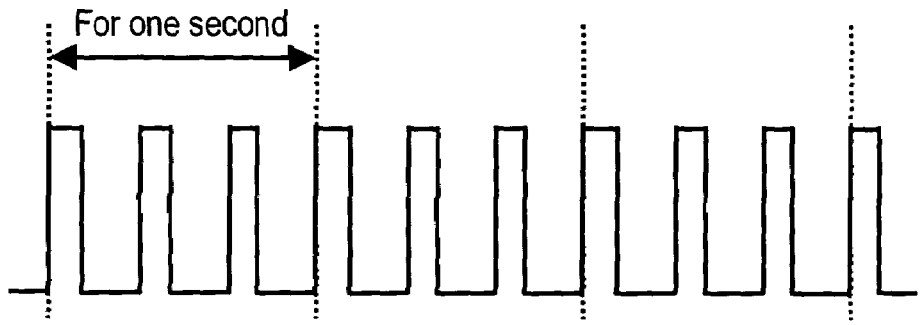
FIGS. 3A to 3C are diagrams of waveforms showing a plurality of kinds of timing in accordance with the first exemplary embodiment.
Figure 3B:
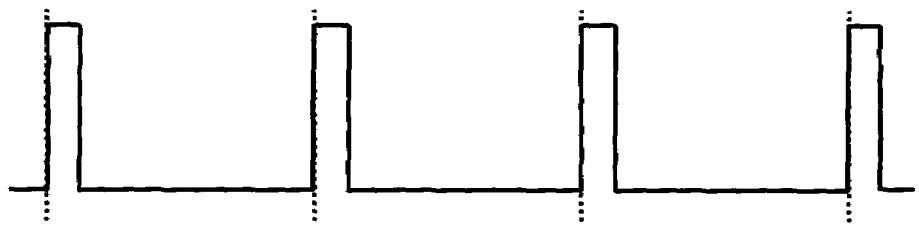
Figure 3C:
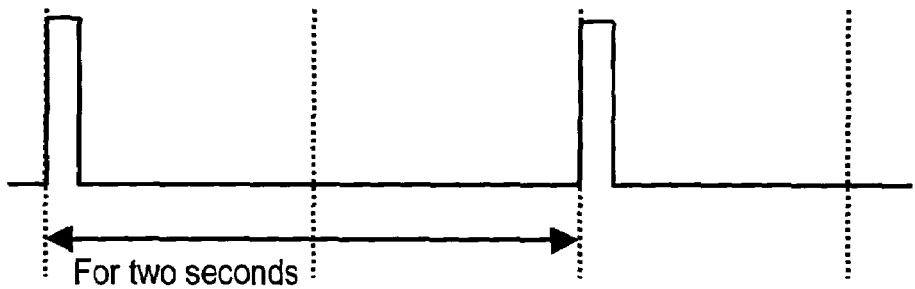

Next, a description is provided of changing the timing at which input reception portion 11 detects input electromagnetic waves. Input reception portion 11 detects an input electromagnetic wave from transmission terminal 20 at a plurality of kinds of timing. FIGS. 3A to 3C are diagrams showing waveforms of clock signals at a plurality of kinds of timing generated by clock generators (not shown) included in input reception portion 11. Input reception portion 11 detects an input electromagnetic wave at the leading edge toward the high level of each waveform of FIG. 3. Therefore, in FIG. 3A, an input electromagnetic wave is detected at a timing of three times a second (timing frequency=H). In FIG. 3B, an input electromagnetic wave is detected at a timing of once a second (timing frequency=M). In FIG. 3C, an input electromagnetic wave is detected at a timing of once every two seconds (timing frequency=L). Because an input electromagnetic wave is detected three times a second when the timing frequency is H, the input electromagnetic wave is detected approximately every 0.3 second. As a result, when an electromagnetic wave is transmitted from transmission terminal 20 for approximately one second, the electromagnetic wave can be detected without fail and received.

Figure 4:
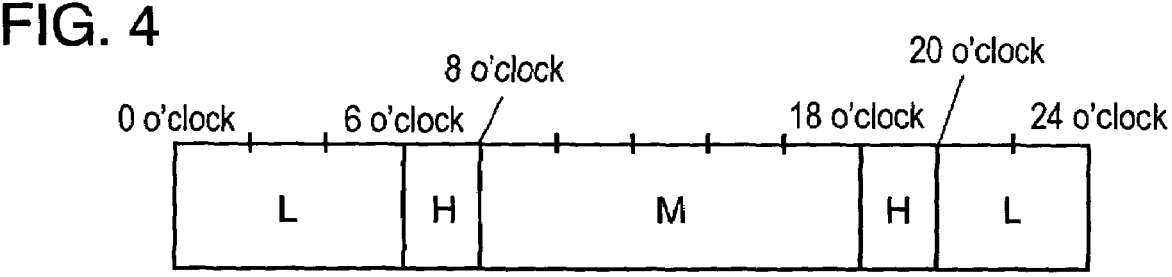
FIG. 4 is a chart showing timing frequencies by time zone in accordance with the exemplary embodiment.

Timing change portion 14 changes the timing at which input reception portion 11 detects an input electromagnetic wave into a predetermined timing by time zone, according to the time indicated by clock portion 15. For example, a description is provided of a case where the timing frequency by time zone is predetermined as shown in FIG. 4. When clock portion 15 detects it is 6 a.m., timing change portion 14 changes the timing at which input reception portion 11 detects an input electromagnetic wave into "timing frequency=H". When clock portion 15 detects that it is 8 a.m., timing change portion 14 changes the timing at which input reception portion 11 detects an input electromagnetic wave into "timing frequency=M". Specifically, timing change portion 14 changes the timing at which input reception portion 11 detects an input electromagnetic wave by changing the frequency of the clock generators included in input reception portion 11.

Next, the electromagnetic wave reception device of this embodiment is described by using a specific example.

In this specific example, a description is provided of an electromagnetic wave reception device on the side of an automobile in a car keyless entry system.

Figure 5:
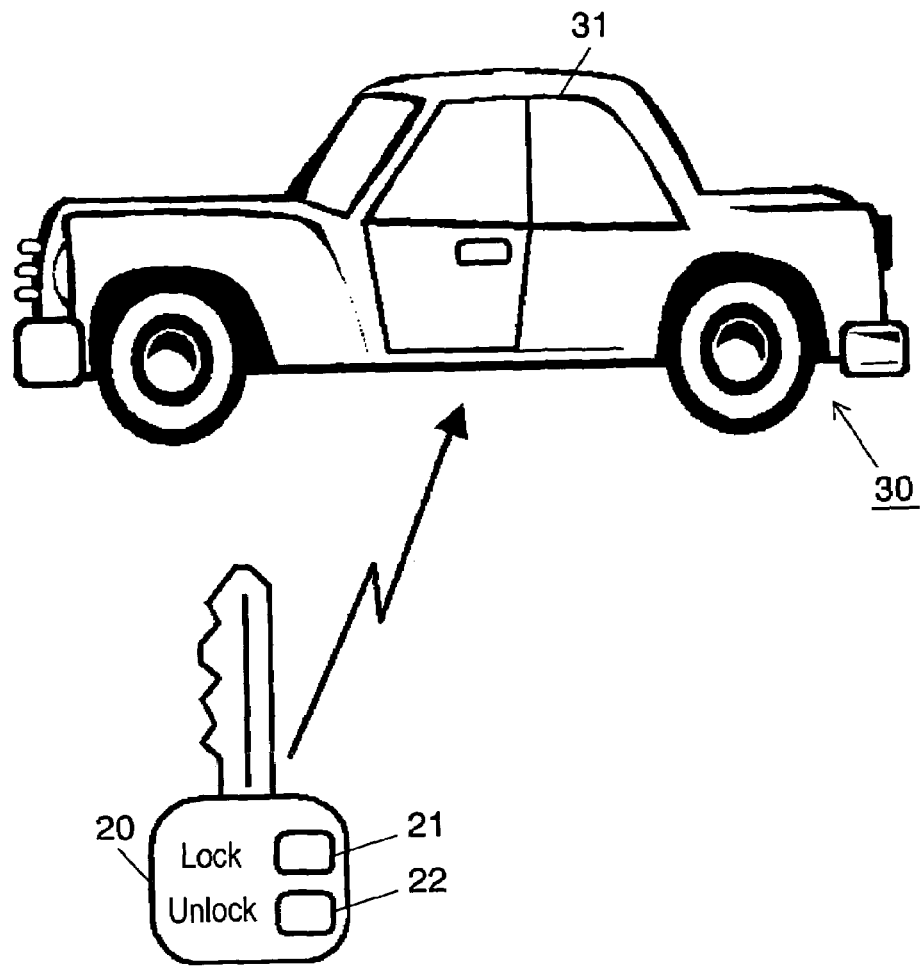
FIG. 5 is a schematic drawing of a key terminal and an automobile in a keyless entry system in accordance with the first exemplary embodiment.

FIG. 5 is a schematic drawing of automobile 30 equipped with an electromagnetic wave reception device of the present invention and transmission terminal 20. The keyless entry system of the present invention is made of the electromagnetic wave reception device incorporated in automobile 30, and transmission terminal 20. As shown in FIG. 5, an example using key terminal 20 as transmission terminal 20 is described hereinafter.

When a user presses lock button 21 or unlock button 22 in key terminal 20, an electromagnetic wave corresponding to the pressed button is transmitted to automobile 30. Then, the electromagnetic wave is received by input reception portion 11 incorporated in automobile 30. According to the electromagnetic wave, lock control portion 12 controls the lock mechanism to lock or unlock doors 31 according to the user's instruction.

In the keyless entry system of the first exemplary embodiment, if the owner of automobile 30 drives automobile 30 to work, the owner frequently gets on and off automobile 30 in time zones in the mornings and evenings. Thus, the lock mechanism is frequently controlled in these time zones. For this reason, the timing at which the electromagnetic wave reception device detects an input electromagnetic wave is set to the values as shown in FIG. 4. Then, in the time zones in the mornings (6 to 8 o'clock) and evenings (18 to 20 o'clock), "timing frequency=H" is set by timing change portion 14 as the timing at which input reception portion 11 detects an input electromagnetic wave. Therefore, in these time zones, an input electromagnetic wave is detected at a timing of three times a second. As a result, when an electromagnetic wave is supplied from key terminal 20 for one second, the electromagnetic wave can be detected by input reception portion 11 on the side of automobile 30 without fail.

In the time zone at night (20 o'clock to 6 o'clock on the next day), "timing frequency=L" is set. Then, in this time zone, an input electromagnetic wave is detected at a timing of once every two seconds. When an electromagnetic wave is supplied from key terminal 20 for one second, input reception portion 11 cannot detect the electromagnetic wave and the user has to press lock button 21 again in some cases. However, the automobile is rarely used in that time zone, and thus the number of times the user has to press the button again is considered to be extremely small. For this reason, considerable inconvenience of the user is not caused. Especially because the system is not stopped, the user can use the keyless entry system. On the other hand, by setting "timing frequency=L" at night, the power consumption for detecting electromagnetic waves in this time zone can be reduced to approximately ⅙ of that required in the time zone of "timing frequency=H".

As described above, because the electromagnetic wave reception device of this embodiment includes timing change portion 14 for changing the timing at which input reception portion 11 detects an input electromagnetic wave, power consumption can be reduced by setting the timing frequency with which input reception portion 11 detects an input electromagnetic wave low. Especially for a battery-powered electromagnetic wave reception device, reduction in power consumption is often required. The electromagnetic wave reception device of this embodiment is useful in such a case. Now, batteries include a primary battery (e.g. manganese dry battery), a secondary battery (e.g. lead accumulator and nickel hydrogen accumulator), and a fuel battery. A "battery-powered electromagnetic wave reception device" includes an electromagnetic wave reception device powered only by a battery, and an electromagnetic wave reception device powered by combination of a battery and power supplied from a generator. Especially when at least input reception portion 11 is powered by a battery, the effect of reduction in power consumption is extremely useful.

In addition, by changing the timing according to time zones, the timing frequency in a time zone in which a user rarely uses a keyless entry system can be set low. Thus, the power consumption in the time zone can be reduced without affecting the convenience of the user. Especially, unlike the conventional example, detection of input electromagnetic waves is not stopped in specified time zones although the timing of detecting input electromagnetic waves is changed. Even when the timing frequency is set low, the car keyless entry system still can be used. Thus, considerable inconvenience of the user is not caused.

As described above, an electromagnetic wave reception device and a keyless entry system incorporating the electromagnetic wave reception device of the present invention can change the timing of detecting input electromagnetic waves, according to the life time zones of a user. Thus, power consumption can be reduced without affecting inconvenience of the user.

Second Exemplary Embodiment

A description is provided of an electromagnetic wave reception device of another exemplary embodiment of the present invention with reference to the accompanying drawings. The electromagnetic wave reception device of the second exemplary embodiment changes the timing of detecting an input electromagnetic wave, according to positions of the electromagnetic wave reception device.

Figure 6:
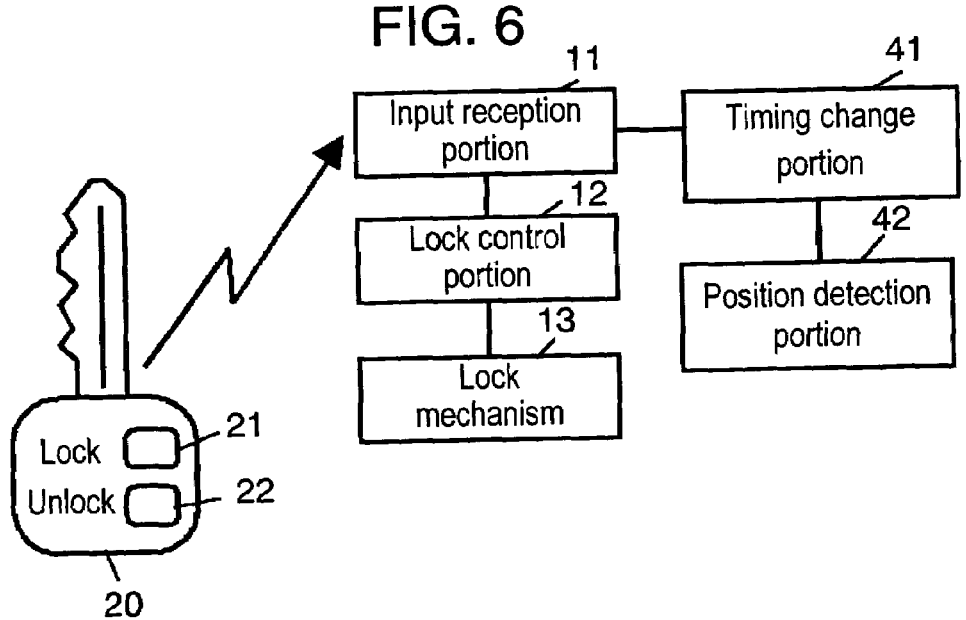
FIG. 6 is a block diagram showing a structure of an electromagnetic wave reception device in accordance with a second exemplary embodiment of the present invention.

FIG. 6 is a block diagram showing the structure of an electromagnetic wave reception device of this exemplary embodiment. With reference to FIG. 6, the electromagnetic wave reception device of this embodiment includes input reception portion 11, lock control portion 12, lock mechanism 13, timing change portion 14, and position detection portion 42. Now, the elements and their operations other than timing change portion 41 and position detection portion 42 are the same as those of the first exemplary embodiment, and thus the descriptions thereof are omitted.

Timing change portion 41 changes the timing at which input reception portion 11 detects an input electromagnetic wave, according to the position detected by position detection portion 42.

Position detection portion 42 detects the position of the electromagnetic wave reception device, and transmits the detected position to timing change portion 41. Now, "positions" include a position uniquely indicated by a longitude and latitude on earth such as: one point or area on a map, and the nature or environment of a position such as: "store area", "residential area", "my house", or "roads"

Next, the operation of the electromagnetic wave reception device of the second exemplary embodiment is described. A description is provided especially of how timing change portion 41 changes the timing, according to positions detected by position detection portion 42. Now, position detection portion 42 includes a global positioning system (GPS), and passes the longitude and latitude detected by the GPS to timing change portion 41 as position information.

Figures 7, 8:
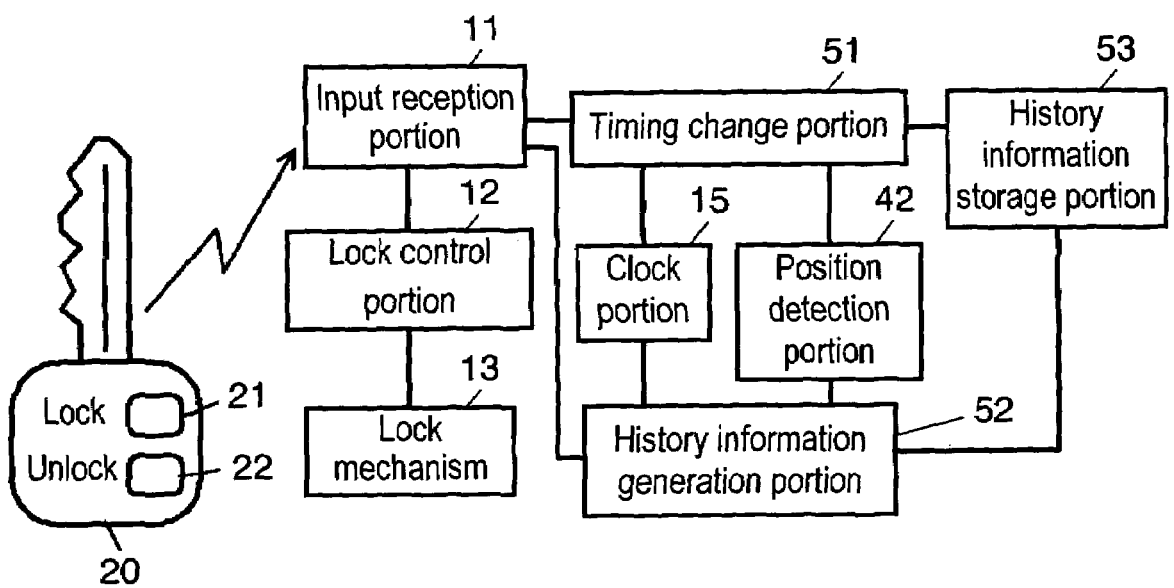
FIG. 7 is a table showing timing frequencies by position in accordance with the second exemplary embodiment.
FIG. 8 is a block diagram showing a structure of an electromagnetic wave reception device in accordance with a third exemplary embodiment of the present invention.

Timing change portion 41 changes the timing at which input reception portion 11 detects an input electromagnetic wave into a predetermined timing by area, according to the position information received from position detection portion 42. For example, the timing frequency of each position is set as shown in FIG. 7. In FIG. 7, "1", "2", "3", and so on indicate predetermined latitude ranges. For example, "1" corresponds to Lat. 35° 10' 10" to 15" N. "A", "B", "C", and so on indicate predetermined longitude ranges. For example, "A" corresponds to Long. 135° 0' 0" to 5" E. When receiving a latitude and longitude in range "1B" as position information, timing change portion 41 sets the timing at which input reception portion 11 receives an input electromagnetic wave to "timing frequency=L". Next, when the electromagnetic reception device moves to another position and timing change portion 41 receives a latitude and longitude in range "1C" as position information, the timing change portion sets the timing to "timing frequency=H".

When the electromagnetic wave reception device of the second embodiment is used in an automobile as a keyless entry system in this manner, "timing frequency=L" can previously be set in areas including roads, fields, and mountains. In an area including a shopping mall to which a user often goes shopping, "timing frequency=H" can previously be set. In an area including the user's house, "timing frequency=M" can previously be set. Setting in this manner allows input reception portion 11 in the automobile to detect an electromagnetic wave from the key terminal without fail in the shopping mall of high timing frequency. In contrast, when a user stops the automobile in the area for which the timing frequency is set low, e.g. an area only including roads and fields, and tries to lock the doors, the user may be forced to press the lock button in the key terminal several times in some cases. However, as the doors may be rarely locked or unlocked in such an area, the frequency with which the user has to press the lock button a plurality of times may be extremely small. On the other hand, setting "timing frequency=L" in such an area can provide an advantage of reducing the power consumption in detecting an input electromagnetic wave. The reason why "timing frequency=M" is set in an area including the user's house is that sensitivity higher than that in the area including the shopping mall is not required there. On the other hand, because it is considered that the automobile is parked at the user's house for an extended period of time, an advantage of effectively reducing the power consumption can be provided.

Incidentally, how the timing frequency is determined according to areas is not limited to the description of the second exemplary embodiment, and can arbitrarily be selected by a user. For example, the timing frequency in an area including the shopping mall can be set to "M", and the timing frequency in an area including the user's house to "H".

In the second exemplary embodiment, detection using the GPS is described. However, the following system can be implemented, for example. One apparatus for transmitting predetermined electromagnetic waves indicating that it is in a shopping mall is installed in the parking lot of the shopping mall. Another apparatus for transmitting predetermined electromagnetic waves indicating that it is a residential area is installed in the residential area. An electromagnetic wave reception device can be structured to determine whether the present position of it is in a shopping mall or a residential area by receiving the electromagnetic waves from the above-mentioned apparatus with the electromagnetic wave reception device.

Alternatively, the timing change according to time zones of the first exemplary embodiment and timing change according to positions of the second exemplary embodiment can be combined.

As described above, an electromagnetic wave reception device including a position detection portion of the second exemplary embodiment can change the timing of detecting input electromagnetic waves so that the timing suits with the movement pattern and the like of a user. Thus, without causing inconvenience of the user, power consumption can be reduced.

Third Exemplary Embodiment

A description is provided of an electromagnetic wave reception device of still another exemplary embodiment of the present invention with reference to the accompanying drawings. The electromagnetic wave reception device of the third exemplary embodiment changes the timing of detecting an input electromagnetic wave according to histories of receiving input electromagnetic waves.

FIG. 8 is a block diagram showing the structure of an electromagnetic wave reception device of the third exemplary embodiment. The electromagnetic wave reception device of the third exemplary embodiment includes input reception portion 11, lock control portion 12, lock mechanism 13, timing change portion 51, clock portion 15, position detection portion 42, history information generation portion 52, and history information storage portion 53. Now, the elements and their operations other than timing change portion 51, history information generation portion 52 and history information storage portion 53 are the same as those of the first and second exemplary embodiments, except that input reception portion 11 outputs receipt of input to history information generation portion 52. Thus, the descriptions thereof are omitted.

Timing change portion 51 changes the timing at which input reception portion 11 detects an input electromagnetic wave, according to history information stored in history information storage portion 53. Now, the history information means the information related to time and positions in which input electromagnetic waves were detected in the past. The history information can be indicated by the number of times of detecting electromagnetic waves in numerical value, or by the frequency of detecting electromagnetic waves in predetermined index (e.g. large and small). Alternatively, the history information can be only a record of information (e.g. fact of detection) when input electromagnetic waves were detected in the past.

History information generation portion 52 generates history information. History information storage portion 53 stores the generated history information. Now, generation of history information includes generation of information on the frequency of detecting input electromagnetic waves indicated in predetermined index, and only a record of detecting input electromagnetic waves.

Next, the operation of the electromagnetic wave reception device of the third exemplary embodiment is described. Especially described are generation of history information, and changing the timing according to the generated history information. Now, position detection portion 42 includes a GPS like the second exemplary embodiment.

Figure 9:
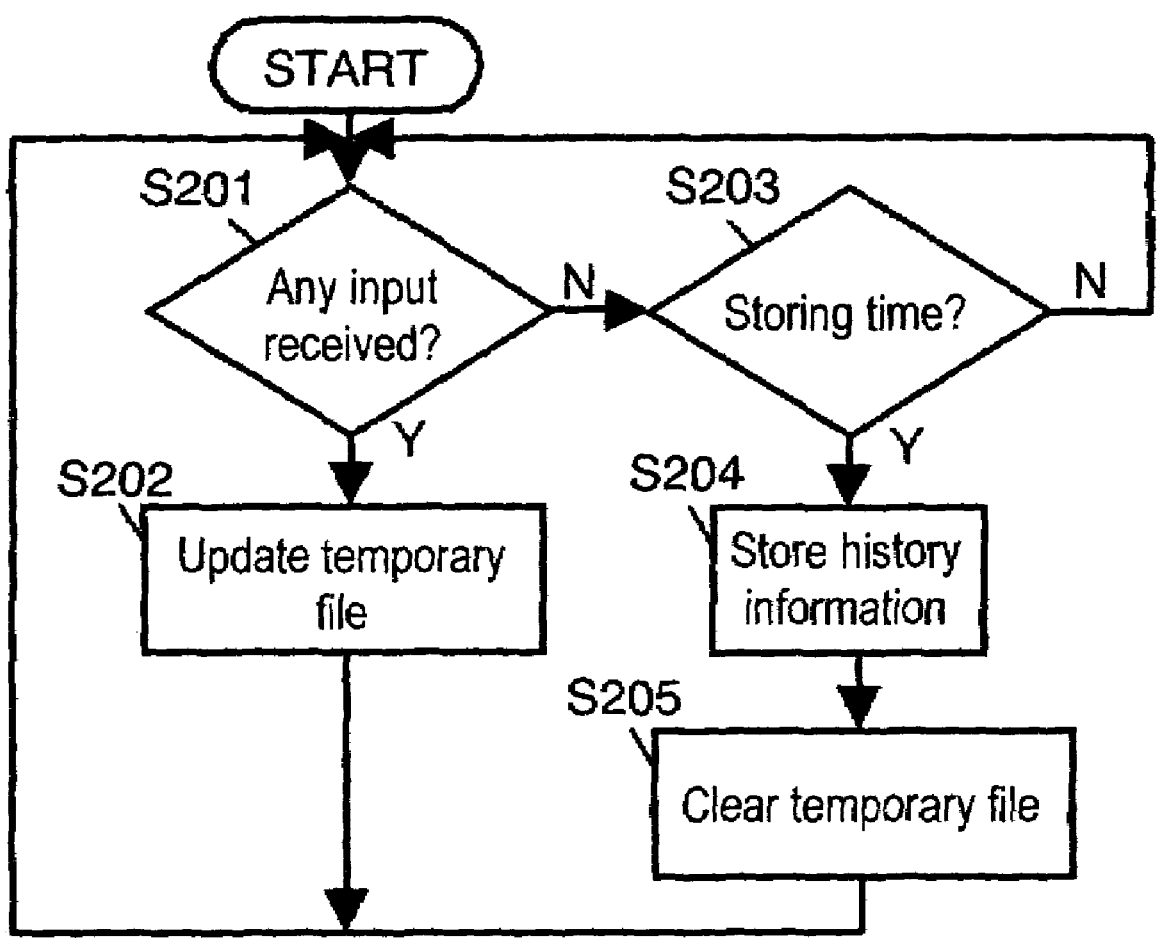
FIG. 9 is a flowchart showing an operation of a history information generation portion in accordance with the third exemplary embodiment.

FIG. 9 is a flowchart showing how history information generation portion 52 generates history information.

In step S201, history information generation portion 52 determines if an input electromagnetic wave has been received from input reception portion 11. When it has been received, the procedure goes to step S202. When it has not been received, the procedure goes to step S203.

In step S202, history information generation portion 52 updates a temporary file stored to generate history information, according to the position information on the position of the electromagnetic wave reception device that has been detected by position detection portion 42 and the time indicated by clock portion 15.

FIGS. 10A and 11A are tables showing examples of a temporary file on time and a temporary file on positions, respectively. In the temporary file of FIG. 10A, information on the time when input reception portion 11 receives input electromagnetic waves is recorded. For example, the file shows that electromagnetic waves are received 16 times from 6 to 8 a.m. from the 1st to 10th Day. In the temporary file of FIG. 11A, information on the positions where input reception portion 11 receives input electromagnetic waves is recorded. For example, the file shows that electromagnetic waves are received 61 times in area "1C".

History information generation portion 52 updates each temporary file by incrementing the corresponding figure in each temporary file by one, according to the time indicated by clock portion 15 and the position information from position detection portion 42.

In step S203, history information generation portion 52 determines if it is a predetermined storing time of the history information. When it is the storing time, the procedure goes to step S204. When it is not the storing time, the procedure returns to step S201. This storing time is predetermined, like 0 a.m. on the 1st every month, for example.

In step S204, history information generation portion 52 generates history information, according to the temporary files stored so far. History information storage portion 53 stores the generated history information.

In case a time temporary file and a position temporary file at generation of the history information are as shown in FIGS. 10B and 11B, history information generation portion 52 converts respective figures into any of the frequencies, "H", "M", and "L", according to predetermined rules. The information converted into the frequencies is the history information described herein. For example, for the time temporary file, the history of a time zone in which the total number of inputs received is 21 or more is indicated by "frequency=H", as shown in FIG. 10C. The history of a time zone in which the total number ranges from 4 to 20 is indicated by "frequency=M". The history of a time zone in which the total number ranges from 0 to 3 is indicated by "frequency=L".

For the position temporary file, the history of an area in which the total number of inputs received is 11 or more is indicated by "frequency=H", as shown in FIG. 11C. The history of an area in which the total number ranges from 1 to 10 is indicated by "frequency=M". The history of an area in which the total number is 0 is indicated by "frequency=L".

Therefore, the history information stored in history information storage portion 53 are as shown in FIGS. 10D and 11D.

With the process as described above, the history information is generated. Incidentally, "total" column in FIG. 10B is given for convenience in description. An actual temporary file need not include this column.

In step S205, history information generation portion 52 clears the contents of the temporary files stored so far, and generates new temporary files. A specific example is given by using a case of May. For the time temporary file shown in FIGS. 10A to 10D, after the history information is stored on the 1st May, the figures in all the time zones from the 1st to 10th May in the record are reset to "0. Also for the position temporary file shown in FIGS. 11A to 11D, the figures in all the areas are reset to "0".

Referring to the history information generated in the above manner, timing change portion 51 changes the timing at which input reception portion 11 receives input electromagnetic waves, also according to the position information received by position detection portion 42 and the time indicated by clock portion 15.

Figures 12, 13:
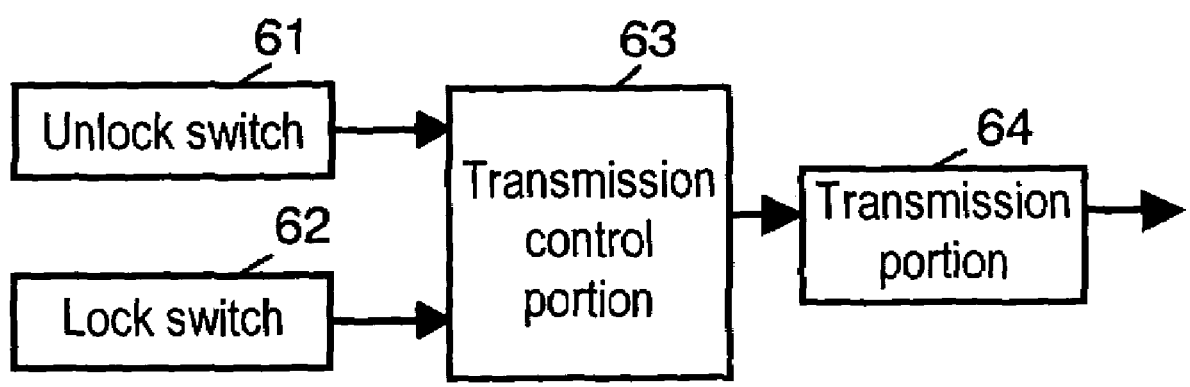
FIG. 12 is a table showing an example of a relation between the history information and timing frequencies in accordance with the third exemplary embodiment.
FIG. 13 is a block diagram showing a structure of an electromagnetic wave transmission device in accordance with a fourth exemplary embodiment of the present invention.

Specifically, timing change portion 51 has a table for determining the timing frequency from the time history information and the position history information. FIG. 12 shows an example of the table. When the position history is "L", for example, in the table of FIG. 12, no input electromagnetic wave is received in the area. For this reason, the timing frequency at this time is determined to "L". Timing change portion 51 changes the timing at which input reception portion 11 receives input signals, using this table, history information, time indicated by clock portion 15, and position information received from position detection portion 42.

Next, an electromagnetic wave reception device of this embodiment is described using a specific example thereof. Like the specific example of the first exemplary embodiment, this specific example describes a case where an electromagnetic wave reception device of this embodiment is used for a keyless entry system of an automobile, with reference to FIG. 5.

First, update of temporary files by history information generation portion 52 is described. For example, when a user presses a lock button 21 in key terminal 20 at 7:15 a.m. on the 23rd April, an electromagnetic wave for locking doors 31 is transmitted to automobile 30. Input reception portion 11 in automobile 30 receives the electromagnetic wave, and lock control portion 12 controls lock mechanism 13 to lock the doors. At the same time, history information generation portion 52 receives the information of receiving the input electromagnetic wave.

Then, history information generation portion 52 increments the figure corresponding to 6 to 8 o'clock from the 21st to 31st in the temporary file of FIG. 10A by one. When the input electromagnetic wave is received in area "1C", history information generation portion 52 increments the figure corresponding to area "1C" in the temporary file of FIG. 11A by one. Thus, the temporary files are updated.

Next, generation and storage of the history information are described. Suppose that the storing time of the time history information is 0 a.m. on the 1st, 11th, and 21st every month, and that the storing time of the position history information is 0 a.m. on the 1st every month. Also suppose that the temporary files at 0 a.m. on the 1st May are as shown in FIGS. 10B and 11B. Then, based on the temporary file of FIG. 10B and the temporary file of FIG. 11B, time history information and position history information are generated according to the rules shown in FIGS. 10C and 11C. The generated time and position history information is stored in history information storage portion 53. Specifically, when history information is generated according to the temporary files of FIGS. 10B and 11B, the history information of FIGS. 10D and 11D is generated.

Next, changing timing according to the history information stored in history information storage portion 53 is described. Now, suppose that history information storage portion 53 stores the history information of FIGS. 10D and 11D.

First, assume that automobile 30 is in area "1C" at 5 a.m. In this case, the history information at 5 a.m. is "L" according to FIG. 10D. On the other hand, the history information in area "1C" is "H" according to FIG. 11D. As a result, according to the table of FIG. 12, "timing frequency=L" is determined. Next, when automobile 30 is still in area "1C" and the time is 6 a.m., the time history information is "H" and thus the timing frequency is changed to "H".

In this manner, an electromagnetic wave reception device of the third exemplary embodiment includes history information generation portion 52 for generating history information, and timing change portion 51 for changing the timing at which input reception portion 11 detects an input electromagnetic wave, according to the generated history information. This structure allows determination of the timing frequency based on the past history of the use of the electromagnetic wave reception device. Thus, the timing can be determined so as to be suitable for the behavior pattern of the user. For this reason, without affecting convenience of the user, power consumption can be reduced. Additionally, because a user need not determine the timing frequency of time and positions beforehand, the user can save the procedure. Further, by updating the history every month, for example, the timing frequency reflecting the latest behavior pattern of the user can be set.

In this exemplary embodiment, both of a time history and a position history are generated, and the timing of detecting an input electromagnetic wave is changed according to both histories. However, timing can be changed according either of the histories, or another history.

In this exemplary embodiment, a case where a time history and position history are separately generated is described. However, history information in which these histories are combined can be generated. For example, it can also be set that the history in area "1C" from 8 to 9 a.m. is "H".

In the third exemplary embodiment, history information on time is described. However, this history information can include information on time zones, information on exact time, and information on both.

In the first to third exemplary embodiments, cases where the electromagnetic wave reception device includes lock mechanism 13 are described. However, the electromagnetic wave reception device need not include lock mechanism 13, and the reception device can control a lock mechanism outside thereof.

In the description of the first to third exemplary embodiments, the timing of detecting an input electromagnetic wave is changed according to time and positions. However, the timing can be changed according to other information. For example, it is highly possible that a lock control signal for instructing locking is transmitted immediately after the engine of an automobile is stopped. For this reason, the timing change portion can set the timing frequency high immediately after the engine is stopped. Alternatively, when input electromagnetic waves are frequently (e.g. 10 times or more) detected for a predetermined period of time (e.g. one hour), the timing frequency during the period can be set high. In contrast, when input electromagnetic waves are rarely detected, the timing frequency during the period can be set low. When the electromagnetic wave reception device is powered by a battery, the timing can be changed according to the remaining amount of power of the battery.

Fourth Exemplary Embodiment

An electromagnetic wave transmission device of an exemplary embodiment of the present invention is described with reference to the accompanying drawings. The electromagnetic wave transmission device of the fourth exemplary embodiment transmits electromagnetic waves by operation of switches.

In FIG. 13, i.e. a block diagram showing the structure of an electromagnetic wave transmission device of the fourth exemplary embodiment, the electromagnetic wave transmission device includes unlock switch 61, lock switch 62, transmission control portion 63, and transmission portion 64.

Figure 14A:
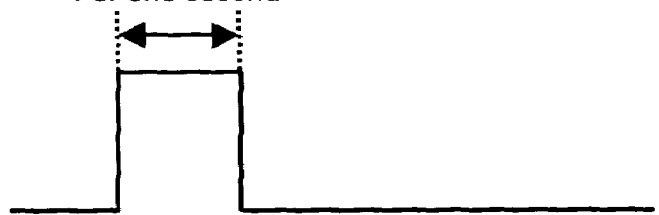
FIGS. 14A and 14B are diagrams of waveforms showing period for which electromagnetic waves are transmitted.
Figure 14B:
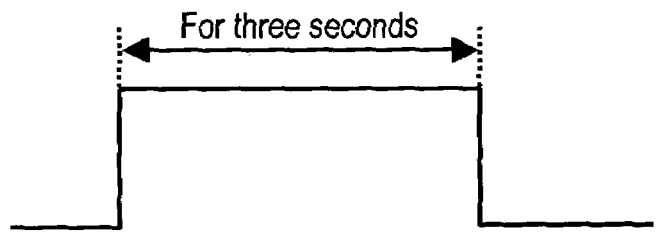

Unlock switch 61 is turned on when an electromagnetic wave for instructing unlocking is transmitted, and is normally turned off. Lock switch 62 is turned on when an electromagnetic wave for instructing locking is transmitted, and is normally turned off. When unlock switch 61 or lock switch 62 is turned on, transmission control portion 63 causes transmission portion 64 to transmit a signal related to lock control corresponding to the switch. When unlock switch 61 or lock switch 62 is turned on twice or more within a predetermined period of time, transmission portion 64 transmits the second electromagnetic wave for a longer period than the first electromagnetic wave. For example, transmission control portion 63 controls so that the second transmission period is for three seconds as shown in FIG. 14B when the first transmission period is for one second as shown in FIG. 14A. Responsive to the instruction from transmission control portion 63, transmission portion 64 modulates a signal related to unlocking or locking and transmits the modulated signal on a carrier wave to an electromagnetic wave reception device (not shown) for receiving the electromagnetic wave. Incidentally, in this description, an electromagnetic wave related to unlocking or locking is transmitted. However, the electromagnetic wave can carry the ID signal of an electromagnetic wave reception device used for validation of the electromagnetic wave transmission device and electromagnetic wave reception device.

Figure 15:
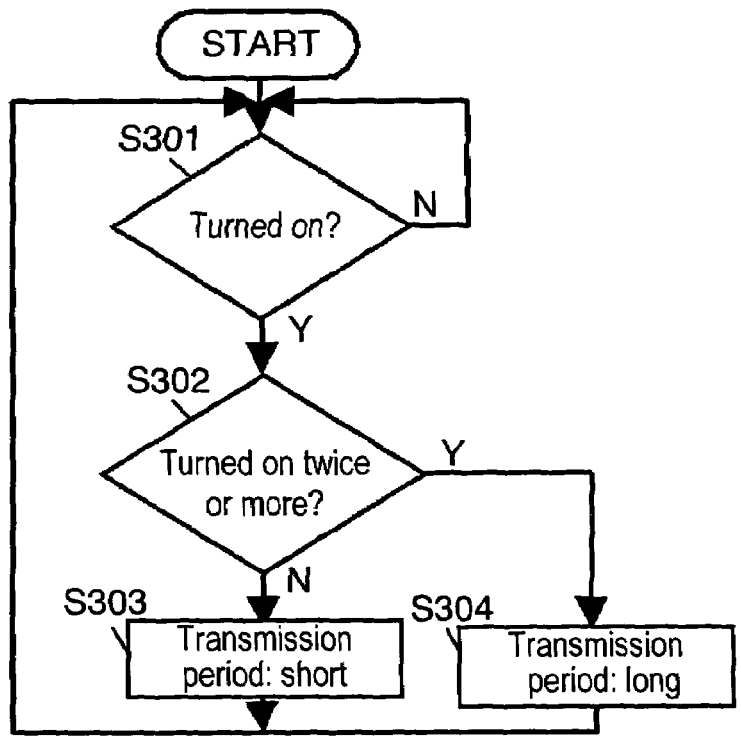
FIG. 15 is a flowchart showing an operation of the electromagnetic wave transmission device in accordance with the fourth exemplary embodiment.

Next, the operation of the electromagnetic wave transmission device of the fourth exemplary embodiment is described. FIG. 15 is a flowchart showing the operation of the electromagnetic wave transmission device of this exemplary embodiment.

In step S301, transmission control portion 63 determines if unlock switch 61 or lock switch 62 is turned on. When either one of the switches is turned on, the procedure goes to step S302. When neither one is turned on, the confirmation process in step S301 is repeated until either switch is turned on.

In step S302, transmission control portion 63 determines if the switch turned on in step S301 has been turned on twice or more for a predetermined period of time. When the switch has been turned on twice or more, the procedure goes to step S304. When the switch has not been turned on twice or more, the procedure goes to step S303. Whether the switch has been turned on twice or more is determined by starting measuring time after the switch has been turned on for the first time and detecting that the switch is turned on again for a predetermined period of time (e.g. 10 seconds). For example, when the switch is turned on again within 10 seconds after the switch has been turned on for the first time, it is determined that the switch has been turned on twice. On the other hand, the switch is turned on 10 seconds after the switch has been tuned on for the first time, it is determined that the switch has been turned on once, and measuring time is started at that time again. Measuring time is completed when a predetermined period of time (e.g. 10 seconds) elapses after the switch has been turned on for the first time.

In step S303, transmission control portion 63 forces transmission portion 64 to transmit a transmission electromagnetic wave corresponding to the switch turned on for a short output period (see FIG. 14A).

In step S304, transmission control portion 63 forces transmission portion 64 to transmit a transmission electromagnetic wave corresponding to the switch turned on for a long output period (see FIG. 14B).

Next, a specific example of an electromagnetic wave transmission device of the fourth exemplary embodiment is described. In this specific example, an electromagnetic wave transmission device of a key terminal in a car keyless entry system is described. Now, the electromagnetic wave reception device on the side of the automobile is one of the electromagnetic wave reception devices of the first to third exemplary embodiments.

Figure 16:
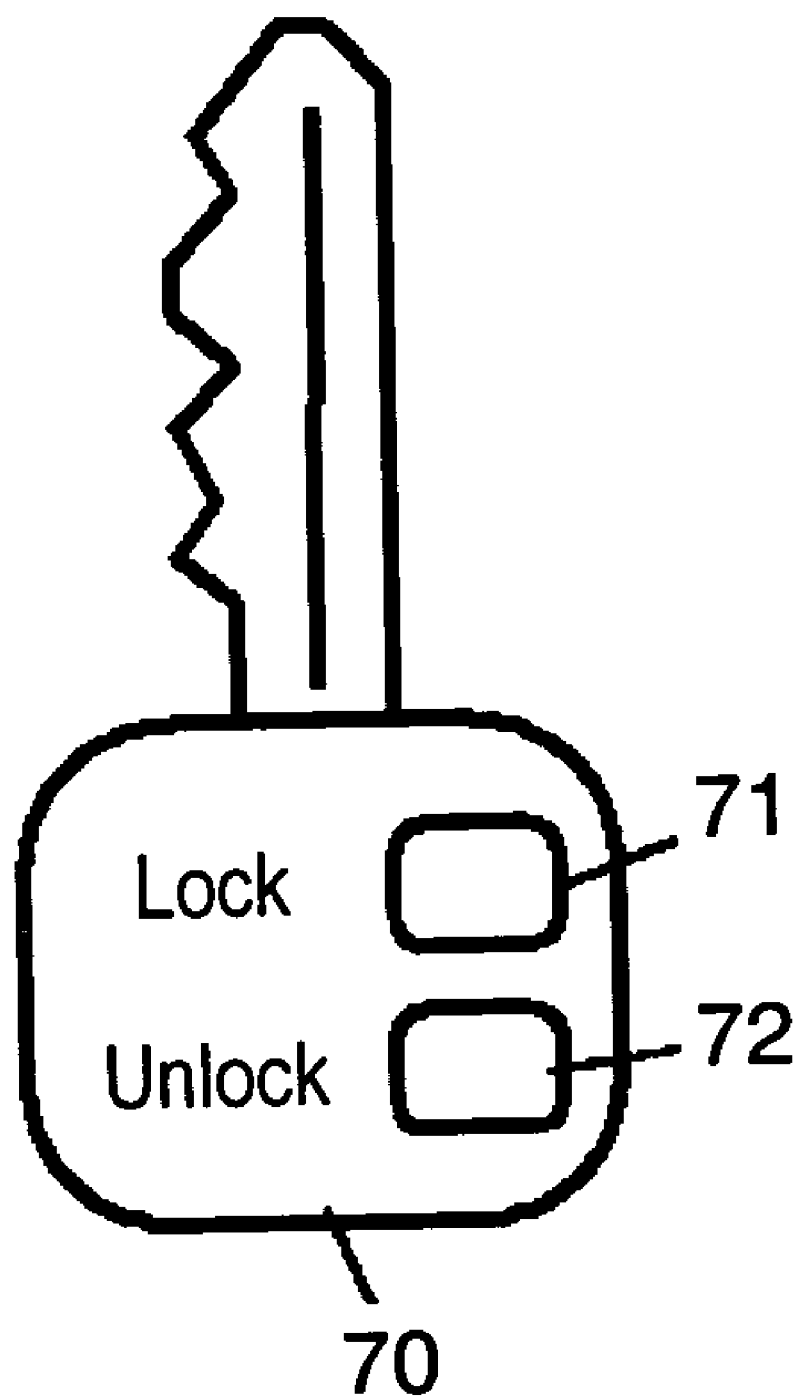
FIG. 16 is a schematic diagram showing an appearance of the electromagnetic wave transmission device in accordance with the fourth exemplary embodiment.

FIG. 16 is a schematic diagram showing key terminal (electromagnetic wave transmission device) 70 in a keyless entry system. Pressing lock button 71 of FIG. 16 turns on lock switch 62. Pressing unlock button 72 turns on unlock switch 61.

Suppose that a user presses unlock button 72, when "timing frequency=L" (e.g. detection of an input signal once every two seconds) is set on an automobile (electromagnetic wave reception device). Then, unlock switch 61 is turned on and it is determined to be a first turning-on operation (steps S301 and S302). Thus, transmission control portion 63 causes transmission portion 64 to transmit an electromagnetic wave for instructing unlocking for one second as shown in FIG. 14A. At this time, because of "timing frequency=L", the transmission timing of the electromagnetic wave may not match the detection timing thereof in some cases. In such a case, the electromagnetic wave transmitted from the automobile side is not detected. When the user presses unlock button 72 again at this time, unlock switch 61 is turned on again and it is determined to be a second turning-on operation (steps S301 and S302). Thus, transmission control portion 63 causes transmission portion 64 to transmit the electromagnetic wave for instructing unlocking for three seconds as shown in FIG. 14B. When it is set that an input signal is detected once every two seconds at "timing frequency 32 L", transmission of the electromagnetic wave for three seconds ensures detection thereof and unlocks the doors of the automobile.

In this specific example, key terminal 70 including lock button 71 and unlock button 72 is described. However, key terminal 70 can be structured to have only one button and pressing the button repeats unlocking and locking alternatively.

As described above, in the electromagnetic wave transmission device of the fourth exemplary embodiment, when unlock switch 61 or lock switch 62 is turned on twice or more within a predetermined period of time, transmitting the second electromagnetic wave for a longer period of time than the first electromagnetic wave can ensure unlocking or locking operation at the second time. Thus, convenience of the user can be improved.

In the above description, the case where the electromagnetic wave transmission device of the fourth exemplary embodiment is used for the electromagnetic wave reception devices of the first to third exemplary embodiments. However, the electromagnetic wave transmission device of the fourth exemplary embodiment can be used for an electromagnetic wave reception device other than those of the first to third exemplary embodiments. For the electromagnetic wave reception devices of the first to third exemplary embodiments, the electromagnetic wave transmission device of the fourth exemplary embodiment or another electromagnetic wave transmission device (a terminal for transmitting electromagnetic waves) can be used.

In each of the above exemplary embodiments, as electromagnetic waves transmitted from the transmission terminal (electromagnetic wave transmission device) to the electromagnetic wave reception device, infrared electromagnetic wave is generally used. However, the electromagnetic wave is not limited to infrared wave, and radio wave in the waveband used for radio frequency communication can be used.

In each of the above exemplary embodiments, a case where an electromagnetic wave reception device is used in an automobile is mainly described. However, the electromagnetic wave reception device can be used in other vehicles (e.g. an automobile, other wheeled vehicles, ships, and airplanes), or used as a lock mechanism at the front door of a house.

Additionally, in each of the above exemplary embodiments, each component can be structured of dedicated hardware, or components that can be implemented by software can be structured by program-controllable software.

Further, combination of the electromagnetic wave reception devices of the first to third exemplary embodiments and the electromagnetic wave transmission device of the fourth exemplary embodiment can provide a secure keyless entry system having great convenience and contributing to energy saving.

INDUSTRIAL APPLICABILITY

As apparent from the above description, the present invention can provide an electromagnetic wave reception device and the like capable of not affecting convenience of the user while reducing power consumption in receiving input electromagnetic waves.

The invention claimed is:

1. An electromagnetic wave reception device used with a transmission device having a predetermined transmission duration, comprising:
   an input reception portion for detecting an input electromagnetic wave transmitted from a transmission terminal at a predetermined timing and receiving the input electromagnetic wave;
   a lock control portion for unlocking or locking a lock mechanism according to the input electromagnetic wave received by the input reception portion; and
   a timing change portion for changing a duration of intervals between detection periods, the detection periods being periods at which the input reception portion detects the input electromagnetic wave,
   wherein the timing change portion changes the duration of the intervals between the detection periods to be shorter when input electromagnetic waves are detected a plurality of times for a predetermined period of time such that the duration of the intervals between the detection periods of the reception device, prior to the change of the duration, is longer than the predetermined transmission duration of the transmission device and the duration of the intervals between the detection periods of the reception device, subsequent to the change of the duration, is shorter than the predetermined transmission duration of the transmission device.

2. The electromagnetic wave reception device of claim 1, wherein the timing change portion changes the duration of intervals between detection periods according to a time zone.

3. The electromagnetic wave reception device of claim 1, further comprising:
   a position detection portion for detecting a position of the electromagnetic wave reception device;
   wherein the timing change portion changes the duration of intervals between detection periods according to the position detected by the position detection portion.

4. The electromagnetic wave reception device of claim 1, further comprising:
   a history information generation portion for generating history information, which is information on a history of reception of the input electromagnetic wave by the input reception portion;
   wherein the timing change portion changes the duration of intervals between detection periods according to the history information.

5. The electromagnetic wave reception device of claim 4, wherein the history information generation portion generates history information of time when the input electromagnetic wave is received.

6. The electromagnetic wave reception device of claim 4, further comprising:
   a position detection portion for detecting a position of the electromagnetic wave reception device;
   wherein the history information generation portion generates history information of a position where the input electromagnetic wave is received, according to the position detected by the position detection portion.

7. The electromagnetic wave reception device of claim 1, wherein at least the input reception portion is powered by a battery.

8. A vehicle comprising the electromagnetic wave reception device of claim 1.

9. The vehicle of claim 8, wherein at least the input reception portion is powered by a battery.

10. An electromagnetic wave transmission device used with a reception device having detection periods at which the reception device detects input electromagnetic waves, a duration of the intervals between detection periods of the reception device having a first duration, comprising:
    a switch;
    a transmission portion for transmitting an electromagnetic wave for a predetermined, first time duration when the switch is turned on; and
    a transmission control portion for controlling the transmission portion so as to transmit a first electromagnetic wave for the predetermined, first time duration when the switch is turned on and a second electromagnetic wave for a second time duration when the switch is turned on at least twice within a predetermined period of time, the second time duration being longer in duration than the predetermined, first time duration such that the predetermined, first time duration is set to be shorter than the first duration of the intervals between detection periods of the reception device and the second time duration is set to be longer than the first duration of the intervals between detection periods of the reception device.

11. A keyless entry system comprising:
an electromagnetic wave reception device installed in a vehicle comprising:
an input reception portion for detecting an input electromagnetic wave transmitted from a transmission terminal at a predetermined timing and receiving the input electromagnetic wave;
a lock control portion for unlocking or locking a lock mechanism according to the input electromagnetic wave received by the input reception portion;
a timing change portion for changing a duration of intervals between detection periods, the detection periods being periods at which the input reception portion detects the input electromagnetic wave; and
an electromagnetic wave transmission device for transmitting a signal to the electromagnetic wave reception device,
wherein the timing change portion changes the duration of the intervals between the detection periods to be shorter when input electromagnetic waves are detected a plurality of times for a predetermined period of time such that the duration of the intervals between the detection periods of the reception device, prior to the change of the duration, is longer than a predetermined transmission duration of the transmission device and the duration of the intervals between the detection periods of the reception device, subsequent to the change of the duration, is shorter than the predetermined transmission duration of the transmission device.

12. The keyless entry system of claim 11, wherein the electromagnetic wave transmission device comprising:
a switch;
a transmission portion for transmitting an electromagnetic wave when the switch is turned on; and
a transmission control portion for controlling the transmission portion so as to transmit a first electromagnetic wave for the predetermined transmission duration when the switch is turned on and a second electromagnetic wave for a second time duration when the switch is turned on at least twice within a predetermined period of time, the second time duration being longer in duration than the predetermined transmission duration.

13. The electromagnetic wave reception device of claim 2, wherein at least the input reception portion is powered by a battery.

14. The electromagnetic wave reception device of claim 3, wherein at least the input reception portion is powered by a battery.

15. The electromagnetic wave reception device of claim 4, wherein at least the input reception portion is powered by a battery.

16. The electromagnetic wave reception device of claim 5, wherein at least the input reception portion is powered by a battery.

17. The electromagnetic wave reception device of claim 6, wherein at least the input reception portion is powered by a battery.

18. A vehicle comprising the electromagnetic wave reception device of claim 2.

19. A vehicle comprising the electromagnetic wave reception device of claim 3.

20. A vehicle comprising the electromagnetic wave reception device of claim 4.

21. A vehicle comprising the electromagnetic wave reception device of claim 5.

22. A vehicle comprising the electromagnetic wave reception device of claim 6.

23. The electromagnetic wave reception device of claim 1, further comprising:
a clock portion for outputting a clock signal having a selected clock frequency among a plurality of clock frequencies, wherein:
the input reception portion detects the input electromagnetic wave at periodic intervals corresponding to the selected clock frequency of the clock signal,
the timing change portion changes the selected clock frequency at which the input reception portion detects the input electromagnetic wave, and
responsive to the input reception portion receiving the input electromagnetic wave a predetermined number of times in the predetermined period of time, the timing change portion changes a current clock frequency to a further clock frequency among the plurality of clock frequencies, as the selected clock frequency, the further clock frequency being a higher frequency than the current clock frequency.

24. The electromagnetic wave reception device of claim 23, further comprising a switch, wherein responsive to the switch being turned on or off, the timing change portion changes the selected clock frequency to a highest clock frequency from among the plurality of clock frequencies.

25. The keyless entry system of claim 11, wherein the electromagnetic wave reception device further comprises:
a clock portion for outputting a clock signal having a selected clock frequency among a plurality of clock frequencies such that: (1) the input reception portion detects the input electromagnetic wave at periodic intervals corresponding to the selected clock frequency of the clock signal, (2) the timing change portion changes the selected clock frequency at which the input reception portion detects the input electromagnetic wave, and (3) responsive to the input reception portion receiving the input electromagnetic wave a predetermined number of times in the predetermined period of time, the timing change portion changes a current clock frequency to a further clock frequency among the plurality of clock frequencies, as the selected clock frequency, the further clock frequency being a higher frequency than the current clock frequency.

26. The keyless entry system of claim 25, wherein responsive to the vehicle being turned on or off, the timing change portion changes the selected clock frequency to a highest clock frequency from among the plurality of clock frequencies.

* * * * *